(12) United States Patent
Davis, Jr. et al.

(10) Patent No.: US 9,422,869 B2
(45) Date of Patent: Aug. 23, 2016

(54) SYSTEMS AND METHODS FOR GAS TURBINE TUNING AND CONTROL

(71) Applicant: General Electric Company, Schenectady, NY (US)

(72) Inventors: Lewis Berkley Davis, Jr., Niskayuna, NY (US); Rex Allen Morgan, Simpsonville, SC (US); Harold Lamar Jordan, Jr., Greenville, SC (US); Scott Richard Baker, Greenville, SC (US)

(73) Assignee: General Electric Company, Schenectady, NY (US)

( * ) Notice: Subject to any disclaimer, the term of this patent is extended or adjusted under 35 U.S.C. 154(b) by 549 days.

(21) Appl. No.: 13/801,259

(22) Filed: Mar. 13, 2013

(65) Prior Publication Data

US 2014/0260312 A1 Sep. 18, 2014

(51) Int. Cl.
*F02C 9/00* (2006.01)
*F02C 9/28* (2006.01)

(52) U.S. Cl.
CPC ... *F02C 9/00* (2013.01); *F02C 9/28* (2013.01); *F05D 2270/0831* (2013.01); *F05D 2270/20* (2013.01); *F05D 2270/303* (2013.01); *F05D 2270/44* (2013.01)

(58) Field of Classification Search
CPC .......... F02C 9/00; F02C 9/28; F05D 2270/44; F05D 2270/20; F05D 2270/083; F05D 2270/0831
See application file for complete search history.

(56) References Cited

U.S. PATENT DOCUMENTS

| | | | |
|---|---|---|---|
| 6,314,735 B1 | 11/2001 | Kolmanovsky et al. | |
| 6,912,856 B2 | 7/2005 | Morgan et al. | |
| 7,100,357 B2 | 9/2006 | Morgan et al. | |
| 7,219,040 B2 | 5/2007 | Renou et al. | |
| 7,742,904 B2 | 6/2010 | Healy et al. | |
| 7,743,599 B2 | 6/2010 | Taware et al. | |
| 7,822,512 B2 * | 10/2010 | Thatcher | F02C 9/20 700/287 |
| 8,127,557 B2 | 3/2012 | Dinu | |
| 9,127,597 B2 * | 9/2015 | Masiello | F02C 9/28 |
| 2005/0107941 A1 * | 5/2005 | Healy | F02C 9/28 701/100 |
| 2007/0074516 A1 | 4/2007 | Peck et al. | |
| 2008/0178600 A1 | 7/2008 | Healy et al. | |
| 2008/0243352 A1 | 10/2008 | Healy | |
| 2009/0158734 A1 | 6/2009 | West et al. | |
| 2010/0286889 A1 | 11/2010 | Childers | |
| 2012/0070266 A1 | 3/2012 | Schaberg et al. | |
| 2012/0072194 A1 * | 3/2012 | Arnold | F02C 7/057 703/7 |

* cited by examiner

*Primary Examiner* — Carlos A Rivera
(74) *Attorney, Agent, or Firm* — Armstrong Teasdale LLP

(57) ABSTRACT

A method of tuning a gas turbine includes receiving a first plurality of operating parameters as the gas turbine engine is operated at a first operating state. Further, the method includes operating the gas turbine engine at a second operating state to measure a second plurality of operating parameters at the second operating state. In addition, the method includes operating the gas turbine engine at a third operating state to measure a third plurality of operating parameters at the third operating state, wherein the first, second, and third operating states are different from each other. Additionally, the method includes generating a correction factor based on the first, second, and third plurality of operating parameters. The method also includes adjusting the operation of the gas turbine engine based on the correction factor.

20 Claims, 9 Drawing Sheets

SYSTEMS AND METHODS FOR GAS TURBINE TUNING AND CONTROL

BACKGROUND OF THE INVENTION

The present invention relates generally to gas turbine engines, and more particularly, to systems and methods for use in tuning gas turbine engines.

At least some known gas turbine engines include controllers that monitor and control their operation. Known controllers govern the combustion system of the gas turbine engine and other operational aspects of the gas turbine engine using operating parameters of the engine. At least some known controllers receive operating parameters that indicate the gas turbine engine's present operating state, define operational boundaries by way of physics-based models or transfer functions, and apply the operating parameters to the operational boundary models. Additionally, at least some known controllers also apply the operating parameters to scheduling algorithms, determine error terms, and control boundaries by adjusting one or more gas turbine engine control effectors. However, at least some operating parameters may be unmeasured parameters, such as parameters that may be impractical to measure using sensors. Some of such parameters include firing temperature (i.e., stage 1 turbine vane exit temperature), combustor exit temperature, and/or turbine stage 1 nozzle inlet temperature.

At least some known gas turbine engine control systems indirectly control or monitor unmeasured operating parameters using measured parameters, such as compressor inlet pressure and temperature, compressor exit pressure and temperature, turbine exhaust pressure and temperature, fuel flow and temperature, ambient conditions, and/or generator power. However, there is uncertainty in the values of indirect parameters, and the associated gas turbine engines may need tuning to reduce combustion dynamics and emissions. Because of the uncertainty of unmeasured parameters, design margins are used for gas turbine engines that include such known control systems. Using such design margins may reduce the performance of the gas turbine engine at many operating conditions in an effort to protect against and accommodate worst-case operational boundaries. Moreover, many of such known control systems may not accurately estimate firing temperature or exhaust temperature of the gas turbine engine, which may result in a less efficient engine and variation from machine-to-machine in facilities with more than one gas turbine engine.

It has proven difficult to reduce variation in firing temperature from machine-to-machine for industrial gas turbines. For example, firing temperature is a function of many different variables, including variations in the components of the gas turbine and their assembly. These variations are due to necessary tolerances in manufacturing, installation, and assembly of the gas turbine parts. In addition, the controls and sensors used to measure the operating parameters of the gas turbine contain a certain amount of uncertainty in their measurements. It is the uncertainty in the measurement system used to sense the values of the measured operating parameters and the machine component variations that necessarily result in variation of the unmeasured operating parameters of the gas turbine engine, such as the firing temperature. The combination of these inherent inaccuracies makes it difficult to achieve the design firing temperature of a gas turbine engine at a known set of ambient conditions and results in firing temperature variation from machine-to-machine.

BRIEF DESCRIPTION OF THE INVENTION

In one aspect, a method of tuning an operating gas turbine engine is provided. The method includes receiving a first plurality of operating parameters as the gas turbine engine is operated at a first operating state. Further, the method includes operating the gas turbine engine at a second operating state to measure a second plurality of operating parameters at the second operating state. In addition, the method includes operating the gas turbine engine at a third operating state to measure a third plurality of operating parameters at the third operating state, wherein the first, second, and third operating states are different from each other. Furthermore, the method includes generating a correction factor based on the first, second, and third plurality of operating parameters. The method also includes adjusting the operation of the gas turbine engine based on the correction factor.

In another aspect, a system for adjusting combustor temperature control during tuning of a gas turbine engine is provided. The system includes at least one control sensor coupled to the gas turbine engine. The at least one control sensor is configured to transmit at least one operating parameter associated with the gas turbine engine to a controller. The system also includes at least one precision sensor coupled to said gas turbine engine. The at least one precision sensor is configured to transmit at least one precision operating parameter associated with the gas turbine engine to a calibration computing device. In addition, the system includes a controller configured to control operation of the gas turbine engine and to receive at least one operating parameter from at least one control sensor. Furthermore, the system includes a calibration computing device. The calibration computing device is configured to receive the precision operating parameter transmitted by the precision sensor.

Further, in another aspect, an alternative method of tuning an operating gas turbine engine is provided. The method includes operating the gas turbine engine at a first operating state to measure a first plurality of operating parameters at the first operating state. Further, the method includes operating the gas turbine engine at a second operating state to measure a second plurality of operating parameters at the second operating state, wherein the first and second operating states are different from each other. Furthermore, the method includes generating a correction factor based on at least the first plurality of operating parameters and the second plurality of operating parameters using a calibration computing device. The method also includes adjusting the operation of the gas turbine engine based on the correction factor including modifying a controller coupled to the gas turbine engine with the correction factor.

DETAILED DESCRIPTION OF THE INVENTION

Figure 1:
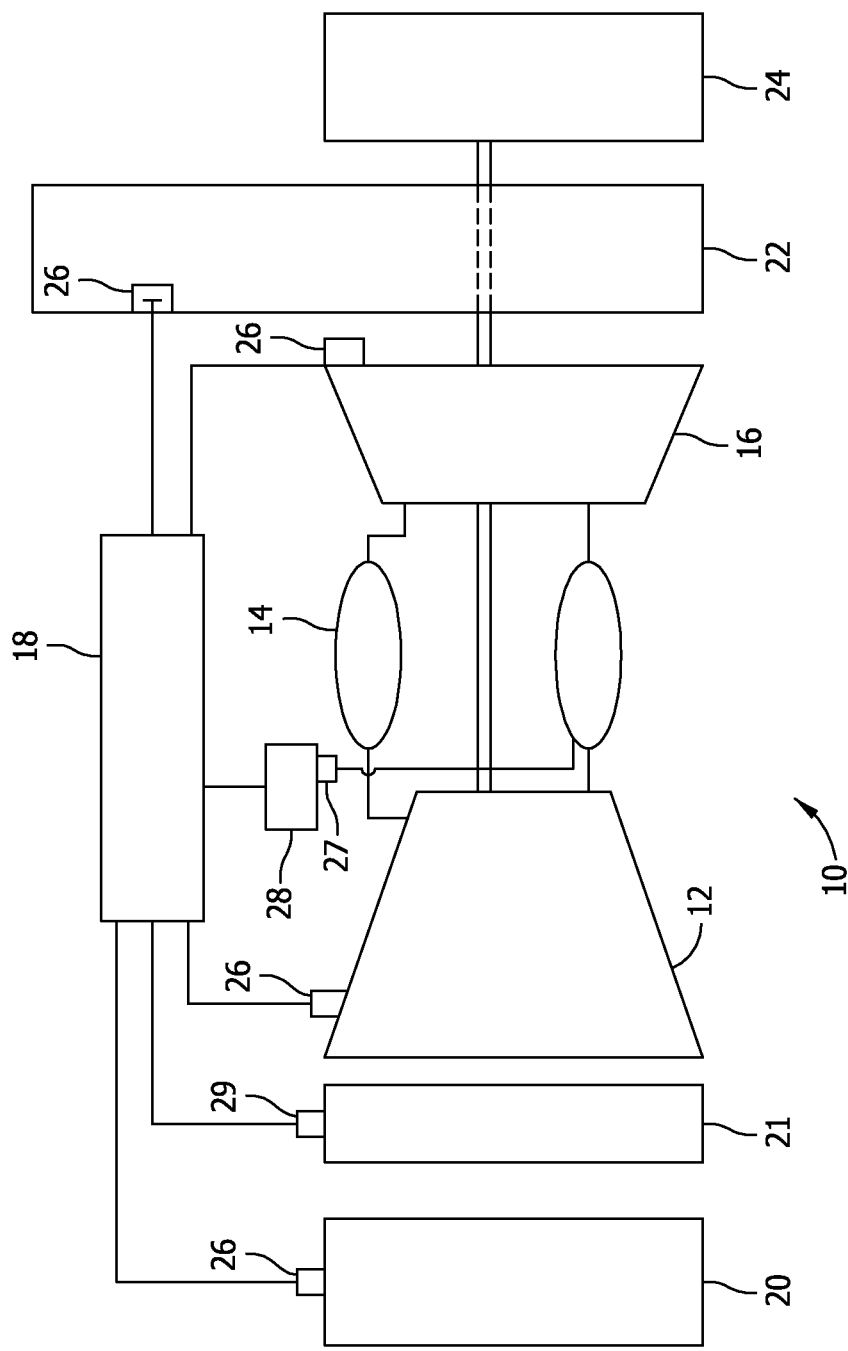
FIG. 1 is a schematic illustration of an exemplary gas turbine engine including an exemplary control system.

FIG. 1 is a schematic illustration of an exemplary gas turbine engine 10 including an exemplary control system 18. In the exemplary embodiment, gas turbine engine 10 includes a compressor 12, a combustor 14, a turbine 16 drivingly coupled to compressor 12, and a computer control system, or controller 18. An inlet duct 20 to compressor 12 channels ambient air and, in some instances, injected water to compressor 12. Duct 20 may include ducts, filters, screens, or sound absorbing devices that contribute to a pressure loss of ambient air flowing through inlet duct 20 and into inlet guide vanes (IGV) 21 of compressor 12. Combustion gasses from gas turbine engine 10 are directed through exhaust duct 22. Exhaust duct 22 may include sound adsorbing materials and emission control devices that induce a backpressure to gas turbine engine 10. An amount of inlet pressure losses and backpressure may vary over time due to the addition of components to inlet duct 20 and exhaust duct 22, and/or as a result of dust or dirt clogging inlet duct 20 and exhaust duct 22, respectively. In the exemplary embodiment, gas turbine engine 10 drives a generator 24 that produces electrical power.

In the exemplary embodiment, a plurality of control sensors 26 detect various operating conditions of gas turbine engine 10, generator 24, and/or the ambient environment during operation of gas turbine engine 10. In many instances, multiple redundant control sensors 26 may measure the same operating condition. For example, groups of redundant temperature control sensors 26 may monitor ambient temperature, compressor discharge temperature, turbine exhaust gas temperature, and/or other operating temperatures the gas stream (not shown) through gas turbine engine 10. Similarly, groups of other redundant pressure control sensors 26 may monitor ambient pressure, static and dynamic pressure levels at compressor 12, turbine 16 exhaust, and/or other parameters in gas turbine engine 10. Control sensors 26 may include, without limitation, flow sensors, speed sensors, flame detector sensors, valve position sensors, guide vane angle sensors, and/or any other device that may be used to sense various operating parameters during operation of gas turbine engine 10.

As used herein, the term "parameter" refers to characteristics that can be used to define the operating conditions of gas turbine engine 10, such as temperatures, pressures, and/or gas flows at defined locations within gas turbine engine 10. Some parameters are measured, i.e., are sensed and are directly known, while other parameters are calculated by a model and are thus estimated and indirectly known. Some parameters may be initially input by a user to controller 18. The measured, estimated, or user input parameters represent a given operating state of gas turbine engine 10.

A fuel control system 28 regulates an amount of fuel flow from a fuel supply (not shown) to combustor 14, an amount split between primary and secondary fuel nozzles (not shown), and an amount mixed with secondary air flowing into combustor 14. Fuel control system 28 may also select a type of fuel for use in combustor 14. Fuel control system 28 may be a separate unit or may be a component of controller 18.

Controller 18 may be a computer system that includes at least one processor (not shown) and at least one memory device (not shown) that executes operations to control the operation of gas turbine engine 10 based at least partially on control sensor 26 inputs and on instructions from human operators. The controller may include, for example, a model of gas turbine engine 10. Operations executed by controller 18 may include sensing or modeling operating parameters, modeling operational boundaries, applying operational boundary models, or applying scheduling algorithms that control operation of gas turbine engine 10, such as by regulating a fuel flow to combustor 14. Controller 18 compares operating parameters of gas turbine engine 10 to operational boundary models, or scheduling algorithms used by gas turbine engine 10 to generate control outputs, such as, without limitation, a firing temperature. Commands generated by controller 18 may cause a fuel actuator 27 on gas turbine engine 10 to selectively regulate fuel flow, fuel splits, and/or a type of fuel channeled between the fuel supply and combustors 14. Other commands may be generated to cause actuators 29 to adjust a relative position of IGVs 21, adjust inlet bleed heat, or activate other control settings on gas turbine engine 10.

Operating parameters generally indicate the operating conditions of gas turbine engine 10, such as temperatures, pressures, and gas flows, at defined locations in gas turbine engine 10 and at given operating states. Some operating parameters are measured, i.e., sensed and are directly known, while other operating parameters are estimated by a model and are indirectly known. Operating parameters that are estimated or modeled, may also be referred to as estimated operating parameters, and may include for example, without limitation, firing temperature and/or exhaust temperature. Operational boundary models may be defined by one or more physical boundaries of gas turbine engine 10, and thus may be representative of optimal conditions of gas turbine engine 10 at each boundary. Further, operational boundary models may be independent of any other boundaries or operating conditions. Scheduling algorithms may be used to determine settings for the turbine control actuators 27, 29 to cause gas turbine engine 10 to operate within predetermined limits. Typically, scheduling algorithms protect against worst-case scenarios and have built-in assumptions based on certain operating states. Boundary control is a process by which a controller, such as controller 18, is able to adjust turbine control actuators 27, 29 to cause gas turbine engine 10 to operate at a preferred state.

Figure 2:
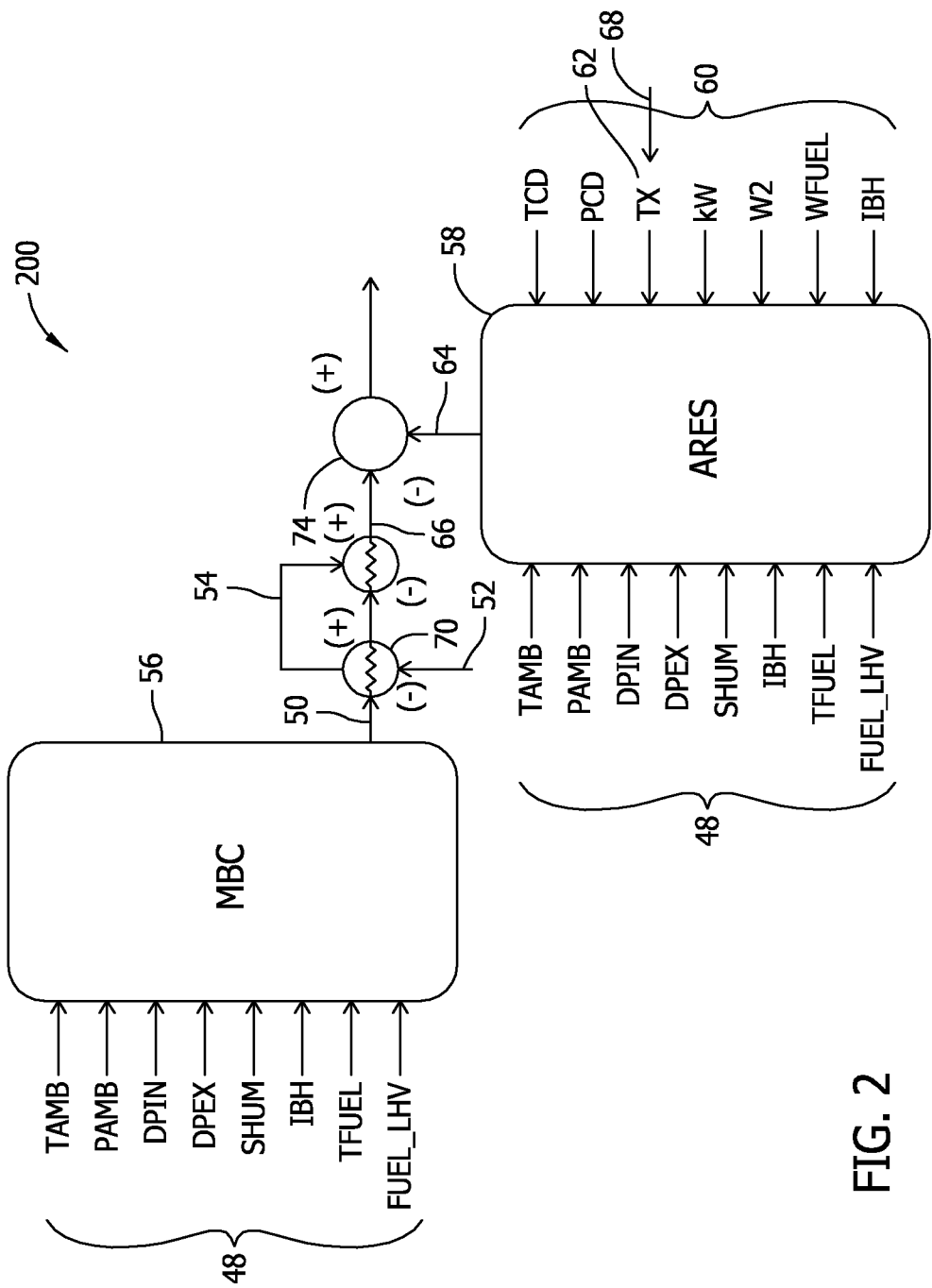
FIG. 2 is a schematic view of an exemplary control architecture that may be used with the control system of FIG. 1 to control operation of the gas turbine engine shown in FIG. 1.

FIG. 2 is a schematic view of an exemplary control architecture 200 that may be used with controller 18 (shown in FIG. 1) to control operation of gas turbine engine 10 (shown in FIG. 1). More specifically, in the exemplary embodiment, control architecture 200 is implemented in controller 18 and includes a model-based control (MBC) module 56. MBC module 56 is a robust, high fidelity, physics-based model of gas turbine engine 10. MBC module 56 receives measured conditions as input operating parameters 48. Such parameters 48 may include, without limitation, ambient pressure and temperature, fuel flows and temperature, inlet bleed heat, and/or generator power losses. MBC module 56 applies input operating parameters 48 to the gas turbine model to determine a nominal firing temperature 50 (or nominal operating state 428). MBC module 56 may be implemented in any platform that enables operation of control architecture 200 and gas turbine engine 10 as described herein.

Further, in the exemplary embodiment, control architecture 200 includes an adaptive real-time engine simulation (ARES) module 58 that estimates certain operating parameters of gas turbine engine 10. For example, in one embodiment, ARES module 58 estimates operational parameters that are not directly sensed such as those generated by control sensors 26 for use in control algorithms. ARES module 58 also estimates operational parameters that are measured such that the estimated and measured conditions can be compared. The comparison is used to automatically tune ARES module 58 without disrupting operation of gas turbine engine 10.

ARES module 58 receives input operating parameters 48 such as, without limitation, ambient pressure and temperature, compressor inlet guide vane position, fuel flow, inlet bleed heat flow, generator power losses, inlet and exhaust duct pressure losses, and/or compressor inlet temperature. ARES module 58 then generates estimated operating parameters 60, such as, without limitation, exhaust gas temperature 62, compressor discharge pressure, and/or compressor discharge temperature. In the exemplary embodiment, ARES module 58 uses estimated operating parameters 60 in combination with input operating parameters 48 as inputs to the gas turbine model to generate outputs 64, such as, for example, a calculated firing temperature 52.

In the exemplary embodiment, controller 18 receives as an input, a calculated firing temperature 52. Controller 18 uses a comparator 70 to compare calculated firing temperature 52 to nominal firing temperature 50 to generate a correction factor 54. Correction factor 54 is used to adjust nominal firing temperature 50 in MBC module 56 to generate a corrected firing temperature 66. Controller 18 uses a comparator 74 to compare the control outputs from ARES module 58 and the control outputs from MBC module 56 to generate a difference value. This difference value is then input into a Kalman filter gain matrix (not shown) to generate normalized correction factors that are supplied to controller 18 for use in continually tuning the control model of ARES module 58 thus facilitating enhanced control of gas turbine engine 10. In an alternative embodiment, controller 18 receives as an input exhaust temperature correction factor 68. Exhaust temperature correction factor 68 may be used to adjust exhaust temperature 62 in ARES module 58.

Figure 3:
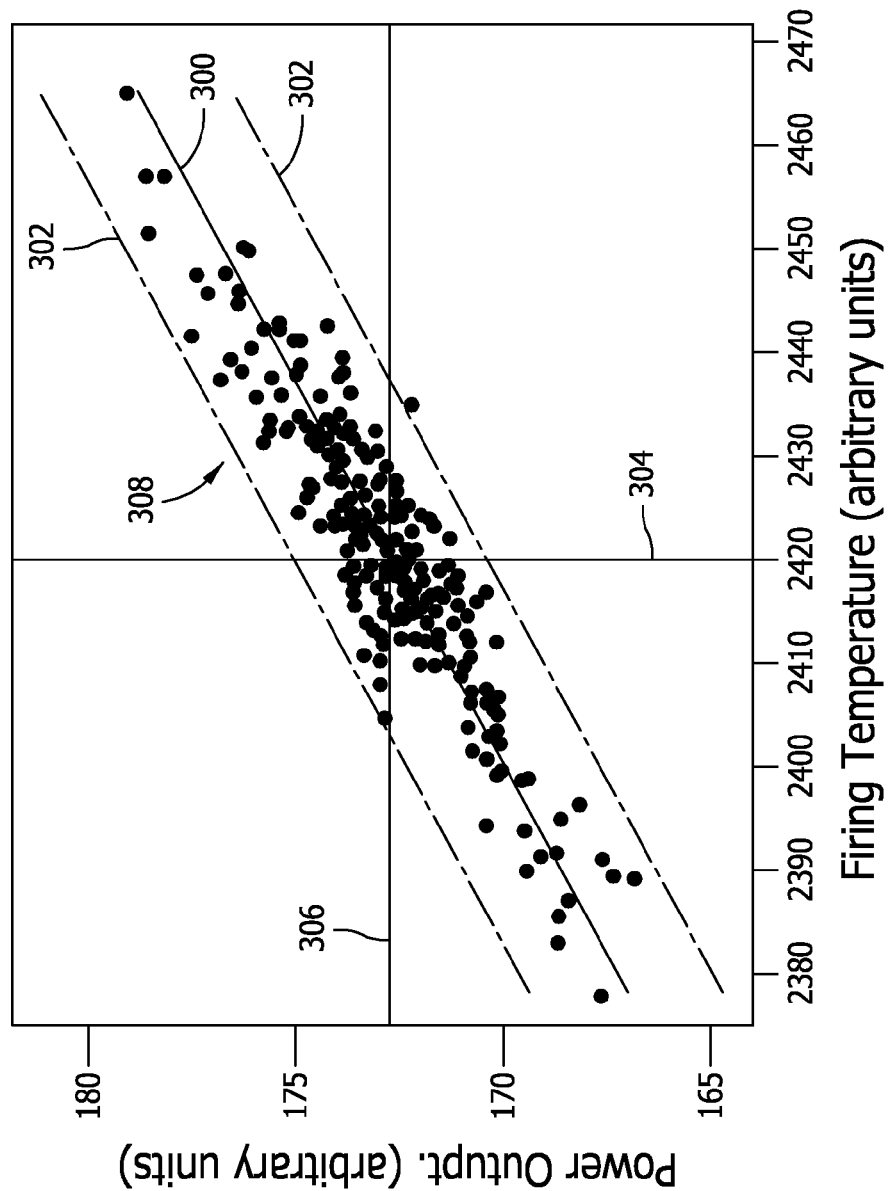
FIG. 3 is a graph that shows a probabilistic simulation of the operating states of a statistically significant number of the gas turbine engine of FIG. 1 using the model of the gas turbine engine used by the control system of FIG. 1.

FIG. 3 is a graph that shows a probabilistic simulation of the operating states of a statistically significant number of the gas turbine engine 10 of FIG. 1 using the model of gas turbine engine used by controller 18. The graph represents power output versus firing temperature of gas turbine engine 10. Line 300 is the linear regression model for the plurality of data points 308. Lines 302 represent the 99% prediction interval corresponding to data points 308. Further, line 304 represents the nominal or design firing temperature 50 for gas turbine engine 10, and line 306 represents a nominal or design power output for gas turbine engine 10. In the exemplary embodiment, the probabilistic simulation shown in FIG. 2 shows an approximate variance in firing temperature of 80 units. This variance may be attributed to the component tolerances of gas turbine engine 10, and the measurement uncertainty of controller 18 and control sensors 26.

Described herein is a method for tuning gas turbine engine 10 that facilitates reducing variation in the actual gas turbine engine 10 operating state, e.g., firing temperature and/or exhaust temperature, which facilitates reducing variation in power output, emissions, and life of gas turbine engine 10.

The method may be implemented as either a discrete process to tune gas turbine engine 10 during installation and at various periods, or may be implemented within controller 18 to run periodically at a predetermined interval and/or continuously during operation of gas turbine engine 10. This method does not measure gas turbine firing temperature directly because firing temperature is an estimated parameter, as previously discussed. This method, however, yields directly measured parameters that are strong indicators of the firing temperature of the gas turbine engine 10.

Figure 4:
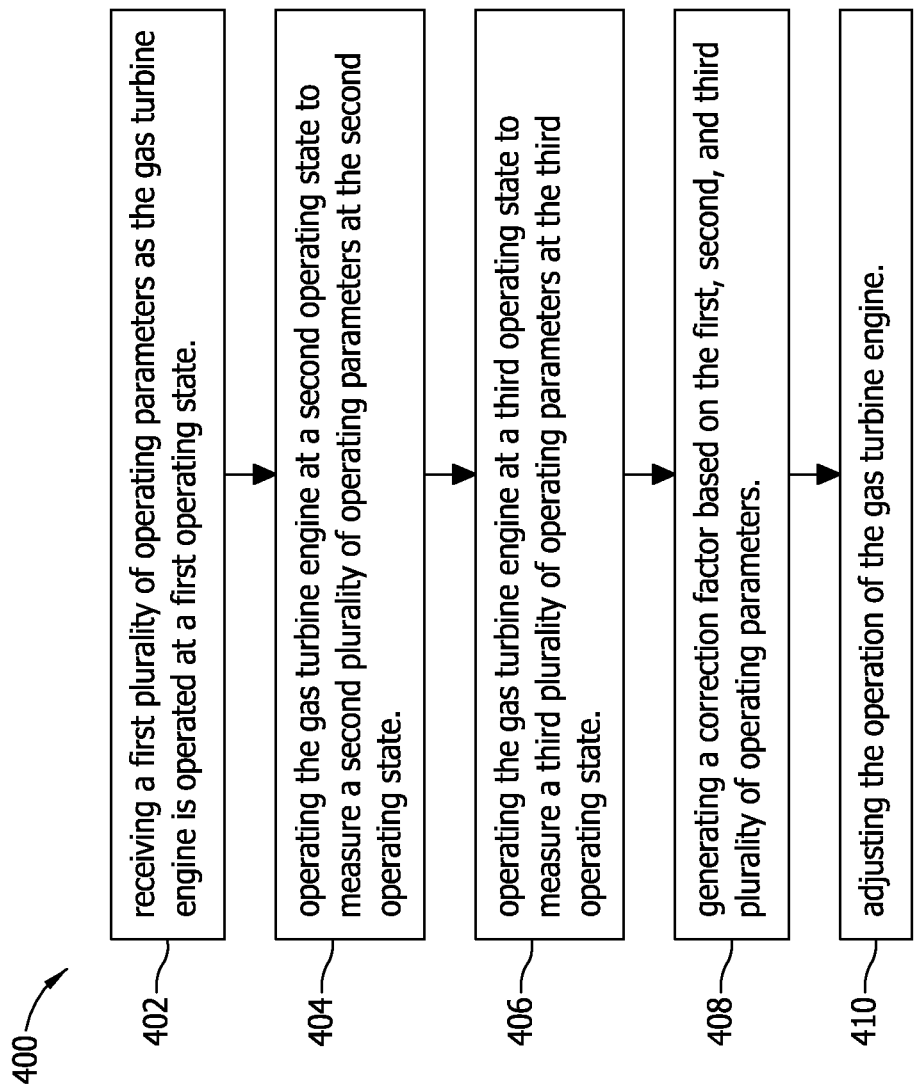
FIG. 4 is a flow chart of an exemplary method that may be implemented to adjust combustor temperature control during tuning of the gas turbine engine shown in FIG. 1.

FIG. 4 is a flow chart of an exemplary method 400 that may be implemented to adjust combustor temperature control during tuning of gas turbine engine 10 (shown in FIG. 1). To facilitate the tuning process, in the exemplary embodiment, controller 18 controls gas turbine engine 10 and commands it to run to a first operating state, e.g., the nominal or design firing temperature 50 or the nominal or design exhaust temperature 62 for the current set of ambient conditions that are measured by controller 18. Due to the component tolerances of gas turbine engine 10, and the measurement uncertainty of controller 18 and control sensors 26, the first operating state, e.g., the operating firing temperature, of gas turbine engine 10 is unknown; however, the probabilistic simulation data shown in FIG. 2 is representative, with a 99% probability, of the firing temperature variation of gas turbine engine 10. As described above, firing temperature is not a directly measurable quantity; however, turbine power output and turbine emissions are directly measureable quantities with reasonable accuracy, and are correlated to firing temperature. After commanding gas turbine engine 10 to run to the first operating state, or nominal firing temperature 50, controller 18 receives 402 input operating parameters 48, including, without limitation, turbine power output and turbine emissions, using control sensors 26. Alternatively, the process of having controller 18 command gas turbine engine 10 to run to the first operating state and receive input operating parameters 48 may be repeated more than one time. The received plurality of input operating parameters 48 may then be statistically analyzed to facilitate reducing the uncertainty associated with the input operating parameters 48 due to the component tolerances of gas turbine engine 10, and the measurement uncertainty of controller 18 and control sensors 26.

Figure 5:
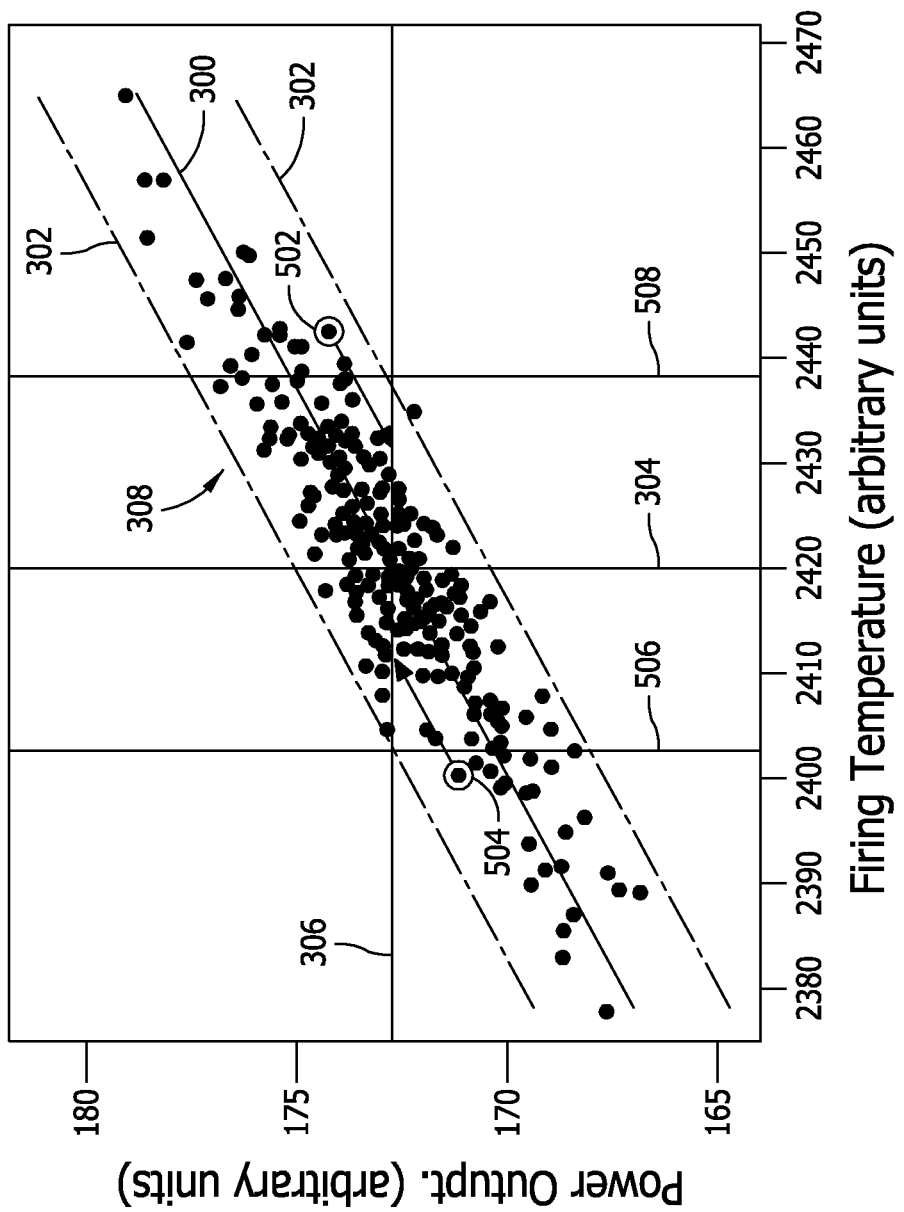
FIG. 5 is a graph of the probabilistic simulation of FIG. 3 illustrating how firing temperature variation is reduced by running the gas turbine engine shown in FIG. 1 to a nominal power output.

In the exemplary embodiment, the directly measurable input operating parameters 48, e.g., the turbine power output and turbine emissions, received by controller 18 are correlated to the firing temperature of gas turbine engine 10. However, the single data point results in significant uncertainty as to whether or not gas turbine engine 10 is operating at the desired temperature level. To facilitate accurately tuning gas turbine engine 10 further, in the exemplary embodiment, as shown in FIG. 4, controller 18 commands 404 gas turbine engine 10 to run to a second operating state, e.g., the nominal or design power output 306. Controller 18 receives input operating parameters 48, including, without limitation, turbine emissions, using control sensors 26, and estimated operating parameters 60, including, without limitation, an estimated firing temperature. Alternatively, as discussed above with respect to the first process, the second process of having controller 18 command gas turbine engine 10 to run to the second operating state and receive input operating parameters 48 and estimated operating parameters 60 may be repeated more than one time. The received plurality of input operating parameters 48 and estimated operating parameters 60 may then be statistically analyzed to facilitate reducing the uncertainty associated with the input operating parameters 48 and the estimated operating parameters 60. FIG. 5 is a graph of the probabilistic simulation of FIG. 3 illustrating how firing temperature variation is reduced by running gas turbine engine 10 to the second operating state, or the nominal power output 306. In the exemplary embodiment, data points 502 and 504 represent a specific gas turbine engine 10. For example, a gas turbine engine 10 represented by data point 502 has more power output than nominal power output 306. A gas turbine engine 10 represented by data point 504 has less power output than nominal power output 306. When controller 18 commands gas turbine engine 10 (which may correspond to any of data points 308) to run to nominal power output 306, the operating condition, e.g., the firing temperature of gas turbine engine 10, changes as illustrated by the arrows for data points 502 and 504. In other words, the firing temperature of gas turbine engine 10 will change, following a line parallel to line 300. When all data points 308 are adjusted to nominal power output 306 as described, all data points 308 will be located on the nominal power output 306 line between lines 506 and 508. As shown in FIG. 5, the firing temperature variation for all data points 308 is reduced by about two, so the variation in emissions and turbine life is reduced.

While the input operating parameters 48 and 60 received by controller 18 corresponding with a gas turbine engine 10 running at the first operating state, i.e., nominal firing temperature 50, and the second operating state, i.e., nominal power output 306, can be used to facilitate reducing actual firing temperature variation, the values cannot be used to locate a specific gas turbine engine 10 along nominal power output 306 line between lines 506 and 508. To further reduce firing temperature variation, it is necessary to locate a specific gas turbine engine 10 along nominal power output 306 line between lines 506 and 508. To facilitate locating a specific gas turbine engine 10 along nominal power output 306 line, a third variable that is correlated to firing temperature is needed.

In the exemplary embodiment, emissions levels in the exhaust of gas turbine engine 10 can be measured with confidence. These emissions levels are correlated to the gas turbine engine 10 firing temperature. Alternatively, any input operating parameter 48 of gas turbine engine 10 that is correlated to firing temperature can be used to further facilitate reducing firing temperature variation of gas turbine engine 10. In the exemplary embodiment, referring to FIG. 4, controller 18 commands 406 gas turbine engine 10 to run to a third operating state, e.g., a nominal or deign emissions level at a specific fuel split. Controller 18 then receives input operating parameters 48 and 60, including, without limitation, an estimated firing temperature and turbine power output. Alternatively, the process of having controller 18 command gas turbine engine 10 to run to the third operating state and receive input operating parameters 48 and 60 may be repeated more than one time. The received plurality of input operating parameters 48 and 60 may then be statistically analyzed to facilitate reducing the uncertainty associated with the input operating parameters 48 and 60 due to the component tolerances of gas turbine engine 10 and the measurement uncertainty of controller 18 and control sensors 26.

In the exemplary embodiment, controller 18 combines the received input operating parameters 48 and 60 from the first, second, and third operating states to determine calculated firing temperature 52 (or the calculated operating state) of gas turbine engine 10. Controller 18 uses a comparator 70 to determine a difference value between nominal firing temperature 50 and calculated firing temperature 52 of gas turbine engine 10 to generate 408 a firing temperature correction factor 54. Firing temperature correction factor 54 is indicative of an error associated with controller 18 and control sensors 26. Controller 18 is modified 410 with firing temperature correction factor 54 to generate corrected firing temperature 66. In an alternative embodiment, calibration computing device 30 compares nominal exhaust temperature 62 to corrected exhaust temperature 66 to calculate a difference value, or exhaust temperature correction factor 68.

Figure 6:
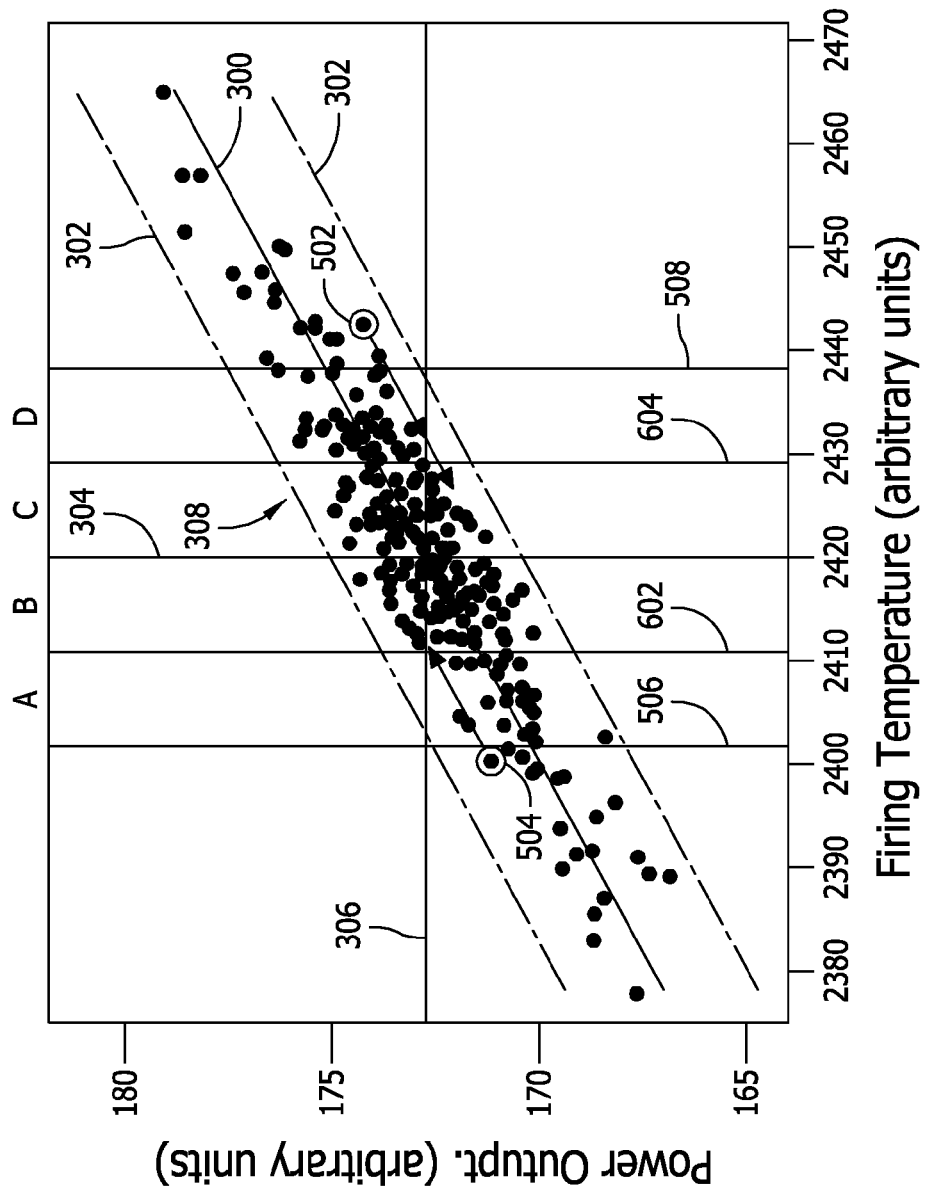
FIG. 6 shows nominal power output line located between the boundary lines shown in FIG. 5 sectioned into four quadrants.

FIG. 6 shows nominal power output line 306 located between lines 506 and 508 of FIG. 5 sectioned into four quadrants. An operating firing temperature of a gas turbine engine 10 that is located in Quadrant A will have measurably lower emissions levels than a gas turbine engine 10 located in one in the other three quadrants, i.e. Quadrants B, C, and D. As such, a gas turbine engine 10 located in Quadrant A can have its operating firing temperature adjusted upward such that the gas turbine engine moves into either Quadrant B or Quadrant C. The emissions level from a gas turbine engine 10 located in Quadrant D will be measurably higher than those in Quadrants A, B, and C, and can therefore have its operating firing temperature adjusted downward such that the gas turbine engine 10 moves into either Quadrant C or Quadrant B. As shown in FIG. 6, the firing temperature variation for all data points 308 is further reduced by about two. Thus, using the described method of tuning gas turbine engine 10, firing temperature variation can be reduced overall by a factor of about 4. Using the operating parameter 48 data measured from the plurality of operating conditions just described significantly reduces the uncertainty in understanding the true operating point of gas turbine 10, and this point can be used to anchor the baseline operating condition of gas turbine engine 10. Thus, referring back to FIG. 4, controller 18 is modified 410 to adjust the commanded or nominal firing temperature 50 based on firing temperature correction factor 54.

In the exemplary embodiment, the preferred execution of method 400 is to progress from start to finish through the plurality of operating states and subsequent determination and application of correction factor 54 to controller 18 without user intervention once method 400 is initiated. However, the execution of exemplary method 400 does not preclude user intervention. As previously discussed, some input operating parameters 48 and 60 may be input by a user into controller 18. These input operating parameters 48 and 60 may be input by a user at any point during execution of method 400, including replacement of the input operating parameters 48 and 60 received by controller 18 at one of the operating states of gas turbine engine 10. Additionally, the execution of method 400 does not preclude a user from intervening to provide additional directions to controller 18, such as requesting controller 18 to repeat a step of method 400 already completed. During user intervention, controller 18 preserves the input operating parameters 48 and 60 received from control sensors 26 at the various operating states of gas turbine engine 10. Controller 18 continues executing method 400 after executing the intervening user request.

As described previously, the exemplary method 400 to adjust combustor temperature control during tuning of gas turbine engine 10 may be implemented as either a discrete process to tune gas turbine engine 10 during installation and at various periods determined by an operator, or method 400 may be implemented as an automatic process within controller 18 to run predetermined periods and/or continuously during operation of gas turbine engine 10. One an advantage of automating and continuously running method 400 during operation of gas turbine engine 10 is that correction factor 54 can be continuously adjusted to facilitate accurately tuning gas turbine engine 10 as the components and control sensors 26 deteriorate over time. However, as described above, the automated execution of exemplary method 400 does not preclude user intervention. Just as with the discrete execution of method 400, some input operating parameters 48 and 60 may be input by a user into controller 18. These input operating parameters 48 and 60 may be input by a user at any point during automated execution of method 400, including replacement of the input operating parameters 48 and 60 received by controller 18 at one of the operating states of gas turbine engine 10. Additionally, the automated execution of method 400 does not preclude a user from intervening to provide additional directions to controller 18, such as requesting controller 18 to repeat a step of method 400 already completed. During user intervention, controller 18 preserves the input operating parameters 48 and 60 received from control sensors 26 at the various operating states of gas turbine engine 10. Controller 18 continues the automated execution of method 400 after executing the intervening user request.

Figure 7:
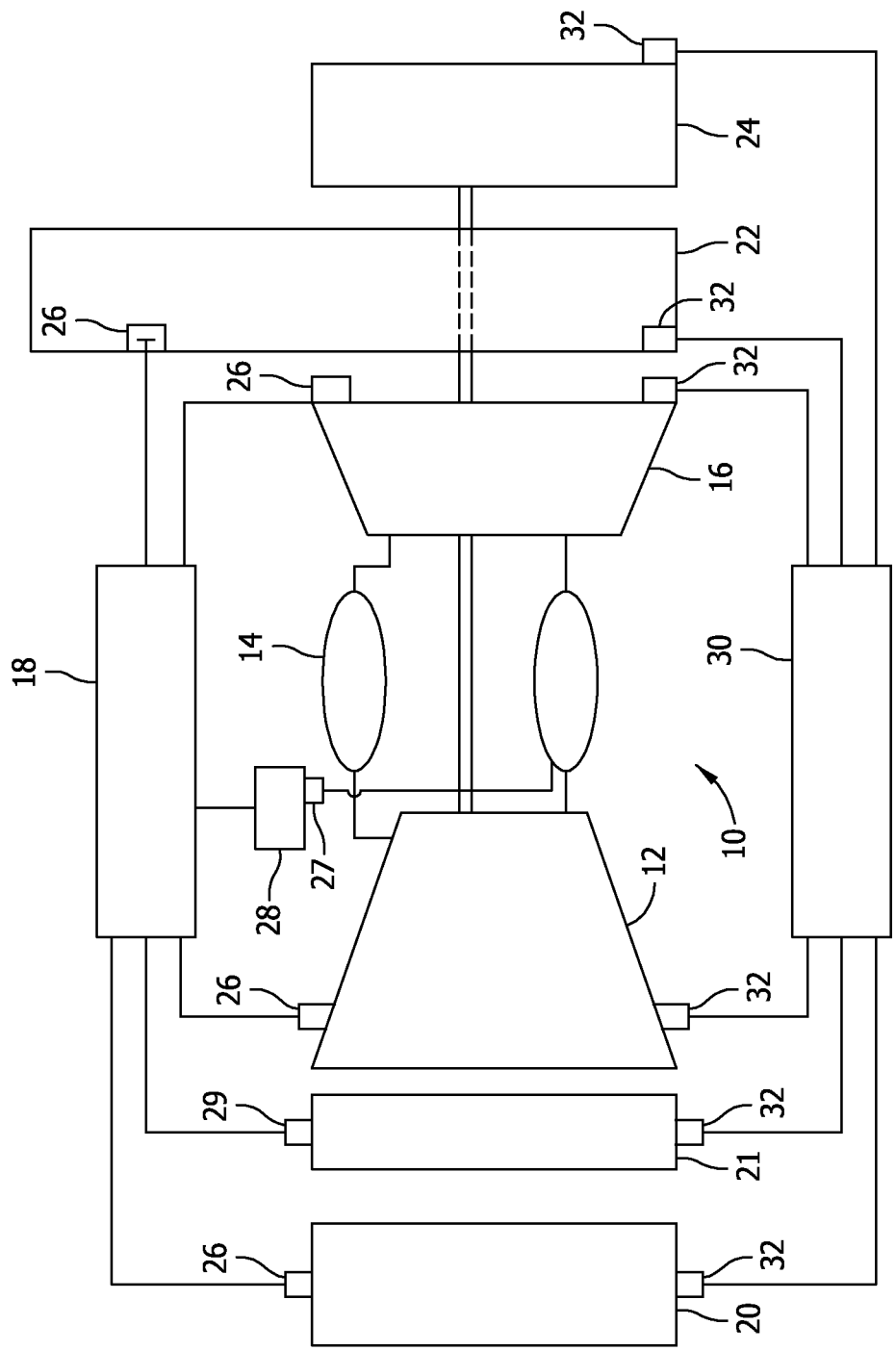
FIG. 7 is a schematic illustration of an alternative embodiment of the gas turbine engine shown in FIG. 1 including a calibration computing device.

FIG. 7 is a schematic illustration of an alternative embodiment of gas turbine engine 10 of FIG. 1 including a calibration computing device 30. In the exemplary embodiment, calibration computing device 30 may monitor the operation of gas turbine engine 10 during initial installation and as gas turbine engine 10 is tuned using precision sensors 32 that detect various observable conditions of gas turbine engine 10, of generator 24, and of the ambient environment as precision operating parameters 33. Sensors 32 may include, without limitation, flow sensors, speed sensors, flame detector sensors, valve position sensors, guide vane angle sensors, or any other device that may be used to sense various operating parameters pertinent to the adjustment operation of gas turbine engine 10. Sensors 32 are generally significantly more accurate than control sensors 26 used with controller 18.

Calibration computing device 30 may be a computer system that includes at least one processor that executes operations to operate gas turbine engine 10 based at least partially on inputs from precision sensors 32. Calibration computing device 30 may include, for example, a model of gas turbine engine 10. The operating parameters sensed by calibration computing device 30 may include, without limitations, compressor inlet pressure and temperature, compressor exit pressure and temperature, turbine exhaust pressure and temperature, fuel flow and temperature, ambient conditions, and/or generator power. Calibration computing device 30 may apply gas turbine engine 10 operating parameters to operational boundary models or to at least one scheduling algorithm to facilitate generating control outputs, such as, without limitation, firing temperature.

Figure 8:
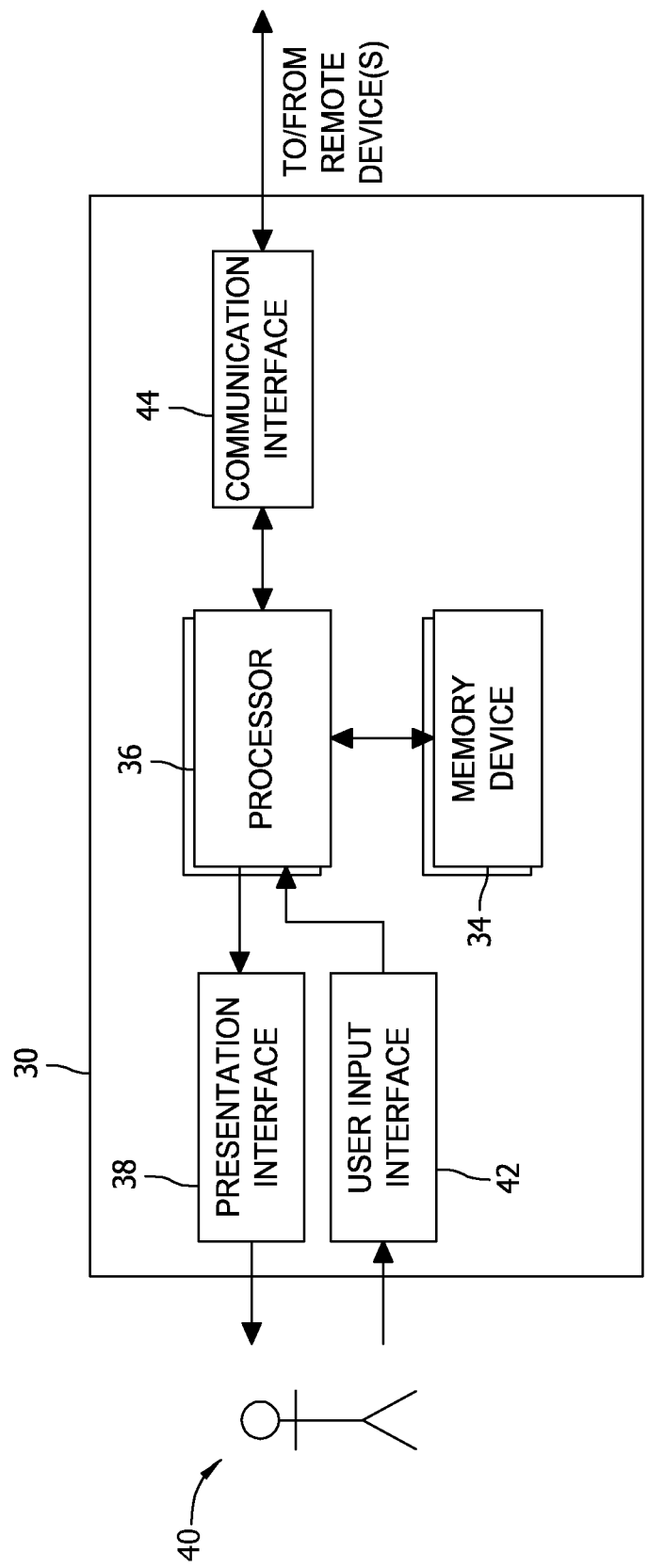
FIG. 8 is a block diagram of the calibration computing device of FIG. 7 that may be used to perform monitoring of any piece of equipment, system, and process, such as, without limitation, monitoring of the operating parameters of the gas turbine engine of FIG. 1.

FIG. 8 is a block diagram of calibration computing device 30 (shown in FIG. 7) that may be used to perform monitoring of any piece of equipment, system, and process, such as, without limitation, monitoring of operating parameters of gas turbine engine 10. In the exemplary embodiment, calibration computing device 30 includes a memory device 34 and a processor 36 that is coupled to memory device 34. Processor 36 may include one or more processing units, such as, without limitation, a multi-core configuration. In some embodiments, executable instructions are stored in memory device 34. Calibration computing device 30 is configurable to perform one or more operations described herein by programming processor 36. For example, processor 36 may be programmed by encoding an operation as one or more executable instructions and providing the executable instructions in memory device 34. In the exemplary embodiment, memory device 34 is one or more devices that enable storage and retrieval of information such as executable instructions or other data. Memory device 34 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

As used herein, the term "computer" and related terms, such as, "computing device", are not limited to integrated circuits referred to in the art as a computer, but rather broadly refers to a microcontroller, a microcomputer, a programmable logic controller (PLC), an application specific integrated circuit, and other programmable circuits, and these terms are used interchangeably herein.

Memory device 34 may be configured to store operational parameters including, without limitation, real-time and historical operational parameter values, or any other type of data. In some embodiments, processor 36 removes or "purges" data from memory device 34 based on the age of the data. For example, processor 36 may overwrite previously recorded and stored data associated with a subsequent time or event. In addition, or alternatively, processor 36 may remove data that exceeds a predetermined time interval. In addition, memory device 34 includes, without limitation, sufficient data, algorithms, and commands to facilitate monitoring and control of the components within a gas turbine engine including, without limitation, precision sensors 32.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In some embodiments, calibration computing device 30 includes a presentation interface 38 coupled to processor 36. Presentation interface 38 presents information, such as a user interface, to a user 40. In one embodiment, presentation interface 38 includes a display adapter (not shown) that is coupled to a display device (not shown), such as a cathode ray tube (CRT), a liquid crystal display (LCD), an organic LED (OLED) display, or an "electronic ink" display. In some embodiments, presentation interface 38 includes one or more display devices. In addition, or alternatively, presentation interface 38 includes an audio output device (not shown), for example, without limitation, an audio adapter, a speaker, or a printer (not shown).

In some embodiments, calibration computing device 30 includes a user input interface 42. In the exemplary embodiment, user input interface 42 is coupled to processor 36 and receives input from user 40. User input interface 42 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 38 and user input interface 42.

In the exemplary embodiment, a communication interface 44 is coupled to processor 36 and is configured to be coupled in communication with one or more other devices, such as precision sensors 32, and to perform input and output operations with respect to such devices while performing as an input channel. For example, communication interface 44 may include, without limitation, a wired network adapter, a wireless network adapter, a mobile telecommunications adapter, a serial communication adapter, or a parallel communication adapter. Communication interface 44 may receive a data signal from or transmit a data signal to one or more remote devices. For example, in an alternative embodiment, communication interface 44 of calibration computing device 30 may transmit/receive a data signal to/from controller 18.

Presentation interface 38 and communication interface 44 are both capable of providing information suitable for use with the methods described herein, such as, providing information to user 40 or processor 36. Accordingly, presentation interface 38 and communication interface 44 may be referred to as output devices. Similarly, user input interface 42 and communication interface 44 are capable of receiving information suitable for use with the methods described herein and may be referred to as input devices.

Figure 9:
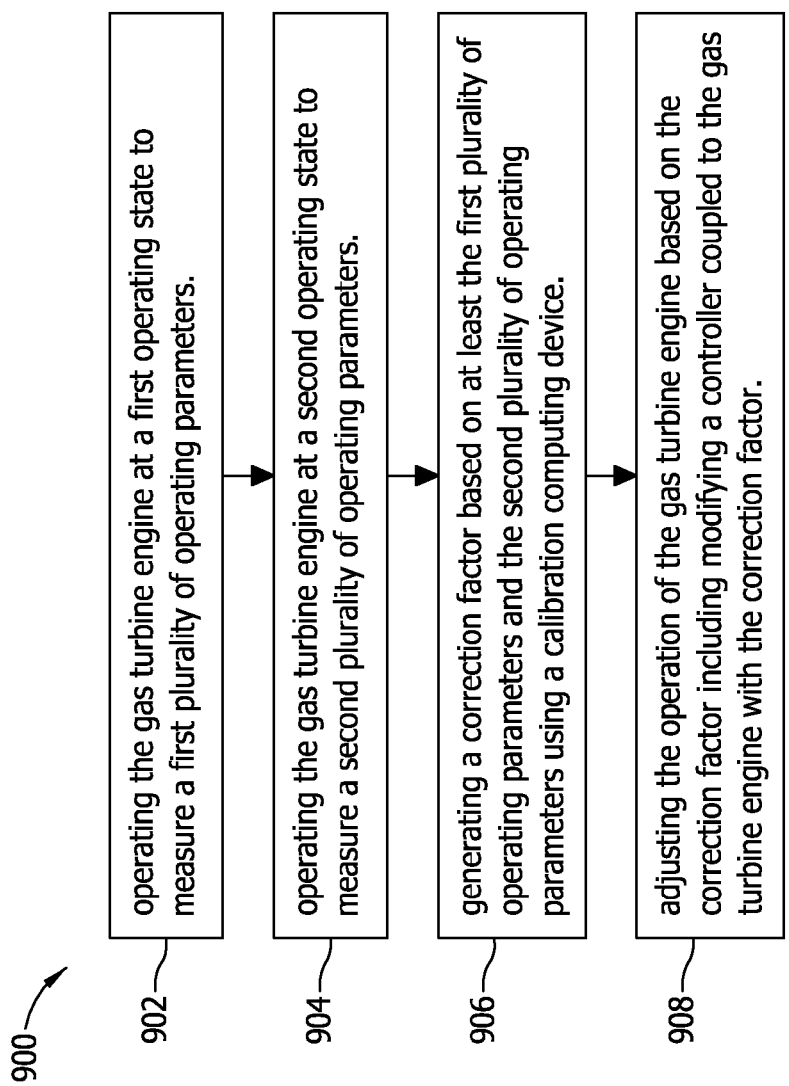
FIG. 9 is a flow chart of an alternative method that may be implemented to adjust combustor temperature control during tuning of gas turbine engine shown in FIG. 1.

FIG. 9 is a flow chart of an alternative method 900 that may be implemented to adjust combustor temperature control during tuning of gas turbine engine 10 (shown in FIG. 1). To facilitate the tuning process, controller 18 controls gas turbine engine 10 and commands it 902 to run to the first operating state, e.g., the nominal or design firing temperature 50 for the current set of ambient conditions that are measured by controller 18. Due to the component tolerances of gas turbine engine 10, and the measurement uncertainty of precision sensors 32, the actual operating state, e.g., the operating firing temperature, of gas turbine engine 10 is unknown; however, the probabilistic simulation data shown in FIG. 2 is representative, with a 99% probability, of the firing temperature variation of gas turbine engine 10. As described above, firing temperature is not a directly measurable quantity; however, turbine power output and turbine emissions are directly measureable quantities with reasonable accuracy. After controller 18 commands gas turbine engine 10 to run to nominal firing temperature 50, calibration computing device 30 receives input operating parameters 48, including, without limitation, turbine power output and turbine emissions, using precision sensors 32. Alternatively, the process of having controller 18 command gas turbine engine 10 to run to the first operating state and receive input operating parameters 48 may be repeated more than one time. The received plurality of input operating parameters 48 may then be statistically analyzed to facilitate reducing the uncertainty associated with the input operating parameters 48 due to the component tolerances of gas turbine engine 10, and the measurement uncertainty of controller 18 and precision sensors 32.

As shown in FIG. 9, controller 18 then commands 904 gas turbine engine 10 to run the second operating state, e.g., nominal or design power output 306. After controller 18 commands gas turbine engine 10 to run to nominal power output 306, calibration computing device 30 receives input operating parameters 48, including, without limitation, turbine emissions, using precision sensors 32, and estimated operating parameters 60, including, without limitation, an estimated firing temperature. Alternatively, as discussed above with respect to the first process, the second process of having controller 18 command gas turbine engine 10 to run to the second operating state and receive input operating parameters 48 and estimated operating parameters 60 may be repeated more than one time. The received plurality of input operating parameters 48 and estimated operating parameters 60 may then be statistically analyzed to facilitate reducing the uncertainty associated with the input operating parameters 48 and the estimated operating parameters 60.

Further, controller 18 may command gas turbine engine 10 to run to a third operating state, e.g., a nominal emissions level. Calibration computing device 30 may then receive input operating parameters 48 and 60, including, without limitation, an estimated firing temperature and turbine power output. Alternatively, the process of having controller 18 command gas turbine engine 10 to run to the third operating state and receive input operating parameters 48 and 60 may be repeated more than one time. The received plurality of input operating parameters 48 and 60 may then be statistically analyzed to facilitate reducing the uncertainty associated with the input operating parameters 48 and 60 due to the component tolerances of gas turbine engine 10 and the measurement uncertainty of controller 18 and precision sensors 32. Calibration computing device 30 then combines the received input operating parameters 48 and 60 from at least the commanded first and second operating states to determine an operating firing temperature of gas turbine engine 10. Alternatively, Calibration computing device 30 may combine input operating parameters 48 and 60 received at the third operating state with the parameters received at the first and second operating states. Calibration computing device 30 determines a difference value between nominal firing temperature 50 and the determined operating firing temperature of gas turbine engine 10 to generate 906 firing temperature correction factor 54 for use in modifying controller 18 to adjust 908 the nominal firing temperature 50. Calibration computing device 30 facilitates further reducing firing temperature variation in gas turbine engine 10 by use of precision sensors 32, which are generally significantly more accurate than control sensors 26 used with controller 18.

The systems and methods as described herein facilitate reducing the variation in the firing temperature or the exhaust temperature of a gas turbine engine due to controller sensor error and component manufacturing tolerances. Specifically, a high fidelity, physics-based model of a gas turbine engine and associated precision equipment and processes are programmed into a processor to create a gas turbine engine controller that automatically adjusts for firing temperature and/or exhaust temperature error. Therefore, in contrast to known controllers that do not adjust for these errors, the systems and methods described herein facilitate reducing the error in firing temperature and exhaust temperature of a gas turbine engine and facilitate reducing the variation from machine-to-machine in settings with multiple gas turbine engines.

An exemplary technical effect of the methods and systems described herein includes at least one of: (a) receiving the operating parameters of a gas turbine engine to determine accurate firing temperatures; (b) determining a correction factor for the gas turbine engine firing temperature; and (c) adjusting the operation of a gas turbine engine by modifying the gas turbine engine controller based on the correction factor.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A method of tuning a gas turbine engine, said method comprising:
   (a) operating the gas turbine engine at a first operating state wherein the gas turbine engine is operated at a nominal firing temperature, and measuring a first set of values for a plurality of operating parameters of the gas turbine engine at the first operating state;
   (b) operating the gas turbine engine at a second operating state wherein the gas turbine engine is operated at a nominal power output, and measuring a second set of values for the plurality of operating parameters at the second operating state;
   (c) operating the gas turbine engine at a third operating state wherein the gas turbine engine is operated at a nominal value for a selected measureable output of the gas turbine engine, wherein the selected measurable output correlates to an actual firing temperature of the gas turbine engine, and measuring a third set of values for the plurality of operating parameters at the third operating state;
   (d) generating a firing temperature correction factor based on the first, second, and third sets of values for the plurality of operating parameters; and
   (e) adjusting the operation of the gas turbine engine based on the firing temperature correction factor.

2. The method in accordance with claim 1, wherein receiving the first set of values for the plurality of operating parameters includes receiving the first set of values for the plurality of operating parameters from at least one control sensor coupled to the gas turbine engine.

3. The method in accordance with claim 1, wherein operating the gas turbine engine at the third operating state comprises operating the gas turbine engine at a nominal emissions level.

4. The method in accordance with claim 1, wherein generating the firing temperature correction factor comprises applying the first, second, and third sets of values for the plurality of operating parameters to at least one of an operational boundary model and scheduling algorithm executed by a controller.

5. The method in accordance with claim 1, further comprising determining a calculated operating state of the gas turbine engine based on the first, second, and third sets of values for the plurality of operating parameters.

6. The method in accordance with claim 5, wherein generating the firing temperature correction factor comprises comparing a nominal operating state to the calculated operating state to calculate a difference value.

7. The method in accordance with claim 6, wherein comparing the nominal operating state to the calculated operating state includes comparing the nominal operating state to the calculated operating state using a controller coupled to the gas turbine engine.

8. The method in accordance with claim 1, wherein adjusting operation of the gas turbine engine comprises modifying a controller coupled to the gas turbine engine with the firing temperature correction factor.

9. The method in accordance with claim 1, wherein steps (a) to (e) are repeated periodically during operation of the gas turbine engine.

10. The method in accordance with claim 1, wherein at least one of steps (a), (b), and (c) are repeated.

11. The method in accordance with claim 1, wherein steps (a) to (e) are automatically executed by a controller coupled to the gas turbine engine.

12. The method in accordance with claim 1, wherein adjusting the operation of the gas turbine engine comprises adjusting a nominal operating state based on the firing temperature correction factor.

13. A method of tuning a gas turbine engine, said method comprising:
   operating the gas turbine engine at a first operating state wherein the gas turbine engine is operated at a nominal firing temperature, and measuring a first set of values for a plurality of operating parameters of the gas turbine engine at the first operating state using a plurality of precision sensors of a calibration computing device, wherein an accuracy of the plurality of precision sensors is higher than an accuracy of a corresponding plurality of sensors of the gas turbine engine;
   operating the gas turbine engine at a second operating state wherein the gas turbine engine is operated at a nominal power output, and measuring a second set of values for the plurality of operating parameters at the second operating state using the plurality of precision sensors;
   generating a firing temperature correction factor based on at least the first set of values for the plurality of operating parameters and the second set of values for the plurality of operating parameters; and
   adjusting the operation of the gas turbine engine based on the firing temperature correction factor including modifying a controller coupled to the gas turbine engine with the firing temperature correction factor.

14. The method in accordance with claim 13, wherein at least one of operating the gas turbine engine at the first operating state and operating the gas turbine engine at the second operating state is repeated.

15. The method in accordance with claim 13, further comprising determining a calculated operating state of the gas turbine engine based on at least the first set of values for the plurality of operating parameters and the second set of values for the plurality of operating parameters.

16. The method in accordance with claim 15, wherein generating the firing temperature correction factor comprises comparing a nominal operating state to the calculated operating state to calculate a difference value.

17. A method of tuning a gas turbine engine, said method comprising:
   (a) operating the gas turbine engine at a first operating state wherein the gas turbine engine is operated at a nominal exhaust temperature, and measuring a first set of values for a plurality of operating parameters of the gas turbine engine at the first operating state;
   (b) operating the gas turbine engine at a second operating state wherein the gas turbine engine is operated at a nominal power output, and measuring a second set of values for the plurality of operating parameters at the second operating state;
   (c) operating the gas turbine engine at a third operating state wherein the gas turbine engine is commanded to operate at a nominal value for a selected measureable output of the gas turbine engine, wherein the selected measurable output correlates to an actual exhaust temperature of the gas turbine engine, and measuring a third set of values for the plurality of operating parameters at the third operating state, wherein the first, second, and third operating states are different from each other;

(d) generating an exhaust temperature correction factor based on the first, second, and third sets of values for the plurality of operating parameters; and
(e) adjusting the operation of the gas turbine engine based on the exhaust temperature correction factor.

18. The method in accordance with claim 17, wherein operating the gas turbine engine at the third operating state comprises commanding the gas turbine engine to operate at a nominal emissions level.

19. The method in accordance with claim 17, wherein generating the firing temperature correction factor comprises applying the first, second, and third sets of values for the plurality of operating parameters to at least one of an operational boundary model and scheduling algorithm executed by a controller.

20. The method in accordance with claim 17, wherein steps (a) to (e) are repeated periodically during operation of the gas turbine engine.

\* \* \* \* \*